(12) United States Patent
Roessler

(10) Patent No.: US 7,804,276 B2
(45) Date of Patent: Sep. 28, 2010

(54) CIRCUIT ARRANGEMENT AND METHOD FOR TRANSFERRING ELECTRICAL CHARGE BETWEEN ACCUMULATORS OF AN ACCUMULATOR ARRANGEMENT INCLUDING A SERIES CIRCUIT OF ACCUMULATORS

(75) Inventor: Werner Roessler, Neufahrn (DE)

(73) Assignee: Infineon Technologies AG, Neubiberg (DE)

( * ) Notice: Subject to any disclaimer, the term of this patent is extended or adjusted under 35 U.S.C. 154(b) by 506 days.

(21) Appl. No.: 11/799,454

(22) Filed: May 1, 2007

(65) Prior Publication Data

US 2008/0272735 A1    Nov. 6, 2008

(51) Int. Cl.
*H02J 7/00* (2006.01)
(52) U.S. Cl. .................... 320/118; 320/119; 320/116
(58) Field of Classification Search ......... 320/116–122, 320/132, 134–136
See application file for complete search history.

(56) References Cited

U.S. PATENT DOCUMENTS

| | | | |
|---|---|---|---|
| 6,373,223 B1 * | 4/2002 | Anzawa et al. | 320/118 |
| 6,373,226 B1 * | 4/2002 | Itou et al. | 320/132 |
| 6,642,693 B2 * | 11/2003 | Anzawa et al. | 320/119 |
| 6,670,789 B2 * | 12/2003 | Anzawa et al. | 320/118 |
| 6,801,014 B1 * | 10/2004 | Chitsazan et al. | 320/119 |
| 6,873,134 B2 | 3/2005 | Canter et al. | |
| 2002/0109482 A1 * | 8/2002 | Anzawa et al. | 320/119 |
| 2003/0141843 A1 * | 7/2003 | Anzawa et al. | 320/118 |
| 2004/0135544 A1 * | 7/2004 | King et al. | 320/116 |
| 2004/0135545 A1 * | 7/2004 | Fowler et al. | 320/118 |
| 2004/0135546 A1 * | 7/2004 | Chertok et al. | 320/118 |
| 2004/0217735 A1 * | 11/2004 | Chitsazan | 320/116 |

OTHER PUBLICATIONS

Moore, Stephen W. and Peter J. Schneider. "A Review of Cell Equalization Methods for Lithium Ion and Lithium Polymer Battery Systems." Society of Automotive Engineers, Inc. 2001. (5 Pages).

* cited by examiner

*Primary Examiner*—Edward Tso
*Assistant Examiner*—Manuel Hernandez
(74) *Attorney, Agent, or Firm*—Maginot Moore & Beck

(57) ABSTRACT

A circuit arrangement for transferring electrical charge between accumulators of an accumulator arrangement includes a number of first series circuits, each connecting in parallel to one of the accumulators, and each comprising a switching element and an inductive storage element connected in series to the load path of the switching element. The circuit arrangement also includes a further series circuit connected in parallel to the accumulator arrangement and comprising a further switching element having a load path and a control terminal, and a further inductive element connected in series to the load path, the further inductive element being inductively coupled to the inductive elements of the first series circuits. The circuit arrangement also includes a control circuit comprising a number of first control outputs connected to the control terminals of the switching elements of the first series circuits, and a further control output connected to the control terminal of the further switching element.

15 Claims, 4 Drawing Sheets

US 7,804,276 B2

CIRCUIT ARRANGEMENT AND METHOD FOR TRANSFERRING ELECTRICAL CHARGE BETWEEN ACCUMULATORS OF AN ACCUMULATOR ARRANGEMENT INCLUDING A SERIES CIRCUIT OF ACCUMULATORS

TECHNICAL FIELD

The invention relates to a circuit arrangement and to a method for transferring electrical charge between accumulators of an accumulator arrangement that comprises a number of accumulators connected in series.

BACKGROUND

Accumulators are rechargeable charge storage devices which in a charged state are capable of providing electric power to a load. The voltage at which the electric power is provided is dependent on the type of accumulator. For lithium-ion accumulators this voltage is in the range of 3.3 V. For supplying loads that require higher supply voltages several accumulators may be connected in series, thereby forming an accumulator arrangement. The supply voltage provided by such accumulator arrangement corresponds to the sum of the individual supply voltages of the accumulators connected in series. For charging the accumulator arrangement it is known to provide a charging current to the accumulator arrangement via connection terminals, to monitor the voltage across the individual accumulators during the charging process, and to finish the charging process when the voltage across one of the accumulators exceeds a given threshold. Exceeding this threshold indicates that the corresponding accumulator is completely charged and should not be charged any further.

To optimize the useful capacity of the accumulator arrangement it is known to balance the charge states of the individual accumulators at the end of the charging process. To this end, a fly back converter may be provided that comprises a primary winding connected to one of the connection terminals of the accumulator arrangement and several secondary windings connected to the accumulators. For balancing the charge states in a first phase of operation, energy is taken from the accumulator arrangement, i.e. the series circuit of the individual accumulators, with the energy being stored in the primary winding. In a second phase of operation, the energy stored in the primary winding is transferred to all secondary windings and via the secondary windings is fed to the individual accumulators.

In this arrangement, the highest current flows into that accumulator across which the lowest voltage is present, i.e. which has the lowest charge state. Due to an internal resistance of each accumulator, the voltage across each individual accumulator increases with a current flowing into the accumulator. This voltage increase counteracts the charging current. Accumulators having a low charge state are therefore charged less than it was required according to their charge state. Furthermore, a part of the overall energy taken from the accumulator arrangement is also fed to those accumulators which have already reached a high charge state, or that have been completely charged, respectively.

SUMMARY

A circuit arrangement according to an example of the invention for transferring electrical charge between accumulators of an accumulator arrangement comprising a series circuit of accumulators comprises a number of first series circuits for connecting in parallel each with an accumulator. These first series circuits each comprise a switching element having a load path and a control terminal, and an inductive storage element being connected in series to the load path of the switching element. The circuit arrangement further comprises a further series circuit for connecting in parallel with the accumulator arrangement, with the further series circuit comprising a further switching element having a load path and a control terminal, and a further inductive storage element connected in series to the load path of the further switching element. In this connection, the inductive storage element of the further series circuit is inductively coupled to the inductive storage elements of the first serious circuits. The circuit arrangement further comprises a control circuit comprising a number of first control outputs, each of which being coupled to the control terminal of one of the switching elements of the first series circuits, and comprising a further control output being coupled to the control terminal of the switching element of the further series circuit.

In this circuit arrangement, each of the first series circuits has a switching element and a inductive storage element, and the further series circuit has a further switching element and a further inductive storage element. The first series circuits and further series circuit form a number of switching converters, which are connected between the accumulator arrangement, i.e. the series circuit of the individual accumulators, and the individual accumulators, where the switching converters may be operated in a bidirectional manner. Via these switching converters, energy may be taken from the accumulator arrangement and may selectively be fed to the individual accumulators of the accumulator arrangement. Furthermore via these switching converters, energy may selectively be taken from the individual accumulators and fed to the accumulator arrangement.

According to an example of a method for transferring electrical charge between accumulators of an accumulator arrangement, that comprises series circuit of accumulators, accumulator voltages across at least some of the accumulators are measured, at least one of the accumulators is selected depending on the measured accumulator voltages, electrical energy is taken from the accumulator arrangement, and at least part of this energy is fed only to the at least one selected accumulator.

According to another example of the method accumulator voltages across at least some of the accumulators are measured, one of the accumulators is selected depending on the measured accumulator voltages, electrical energy is taken from the selected accumulator, and at least part of the taken energy is fed to the accumulator arrangement, i.e. the series circuit of accumulators.

BRIEF DESCRIPTION OF THE DRAWINGS

The invention can be better understood with reference to the following drawings and description. The components in the figures are not necessarily to scale, instead emphasis being placed upon illustrating the principles of the invention, whereas only the components necessary for understanding the principles are depicted. In the figures like reference symbols designate corresponding parts.

DETAILED DESCRIPTION OF THE DRAWINGS

Figure 1:
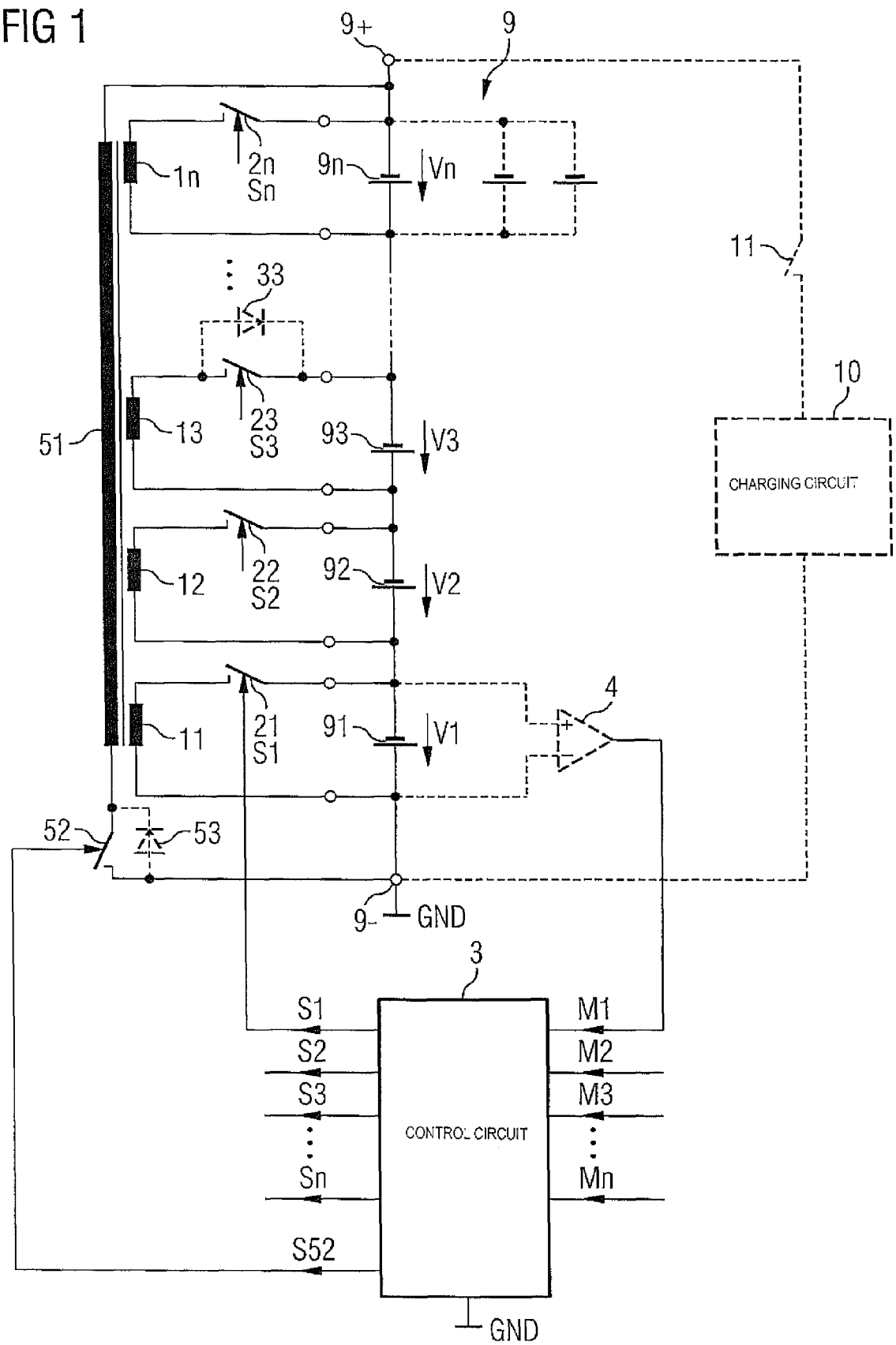
FIG. 1 shows a first example of a circuit arrangement for transferring electrical charge between accumulators, with the circuit arrangement comprising a number of first series circuits each having a switching element and an inductive storage element, and a further series circuit having a further switching element and a further inductive storage element.

FIG. 1 shows a first example of a circuit arrangement for transferring electrical charge between accumulators of an accumulator arrangement. For a better understanding in FIG. 1 an accumulator arrangement 9 is also depicted in addition to the circuit arrangement.

The accumulator arrangement 9 comprises a series circuit with a plurality of accumulators 91, 92, 93, 9n. The accumulator arrangement of FIG. 1 comprises four accumulators 91, 92, 93, 9n. However, it should be understood that any number of accumulators may be connected in series. Each of the accumulators 91-9n may be comprised of an accumulator cell. Furthermore, two or more accumulator cells may be connected in parallel for forming an accumulator, which in FIG. 1 is depicted in dashed lines for accumulator 9n.

The accumulator arrangement 9 comprises two connection terminals 9+, 9−, namely a first connection terminal 9+ at a first end of the series circuit and a second connection terminal 9− at a second end, which is opposite to the first end, of the series circuit. In the example the first connection terminal forms a positive terminal and the second connection terminal forms a negative terminal of the accumulator arrangement.

The individual accumulators 91-9n each serve for storing energy in form of electrical charge. For charging the accumulator arrangement with electric energy a charging circuit 10 may be connected to the connection terminals 9+, 9− of the accumulator arrangement 9, for example via a switch 11. The charging circuit 10, which is depicted in dashed lines in FIG. 1, is not part of the invention and is shown for a better understanding, only. Layout and function of those charging circuits are well-known, further explanations are therefore not necessary.

The accumulator arrangement 9 may be charged by feeding a charging current to the first connection terminal 9+, and may be discharged by drawing a discharging current from this first connection terminal 9+. The accumulator arrangement 9 may be discharged prior to a new charging process, for example. This increases the lifetime of the accumulator arrangement 9, i.e. helps to reach a high number of charging and discharging cycles before the accumulator arrangement is exhausted and is therefore no longer capable of storing electric energy as desired.

Figure 2:
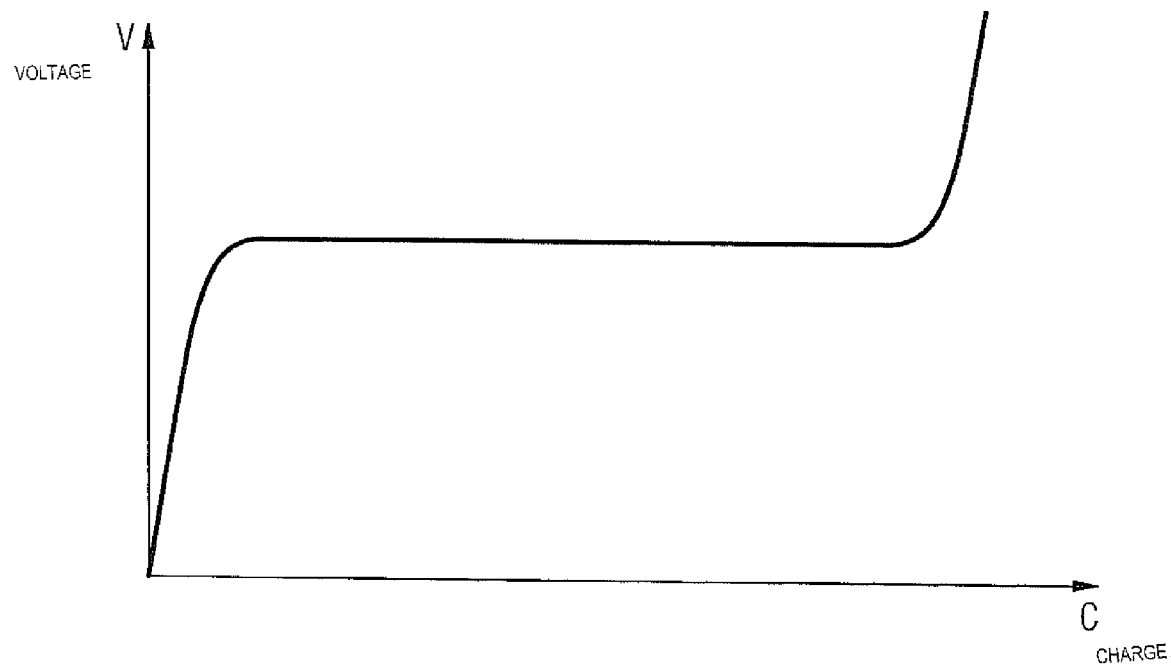
FIG. 2 schematically shows a charging curve of an accumulator, where a voltage across the accumulator is shown dependent on the charge stored in the accumulator.

During charging and discharging the accumulator arrangement 9, different charge states of the individual accumulators 91-9n may occur. For a better understanding attention is drawn to FIG. 2 in which a charging curve of an accumulator is schematically shown. FIG. 2 shows the voltage across the accumulator dependent on the charge C stored in the accumulator. The charge C stored in the accumulator defines the charge state of the accumulator. The voltage V available across the accumulator for a wide range of the charge state is approximately constant. For lithium-ion accumulators this voltage, which is also referred to as nominal voltage, is between 3.3 V and 3.6 V. The range of the charge state, for which the voltages is approximately constant, is referred to as operating area in the following. If the accumulator is charged beyond the operating area the accumulator voltage increases rapidly, which is shown in the right part of the figure; the maximum storage capacity of the accumulator is then reached, the accumulator may not be charged any further. If the accumulator is discharged below the operation area, the accumulator voltage decreases rapidly, which is shown in the left part of FIG. 2.

Due to production processes or due to different wear during operation the individual accumulators may comprise different capacities, with the result that some of the accumulators during the charging process are completely charged earlier than others of the accumulators. The charging process should be stopped as soon as one of the accumulators reaches its maximum charge state. Correspondingly, during the discharging process some of the accumulators may be discharged below their operating area earlier than others of the accumulators. In this connection the discharging process should be stopped, as soon as one of the accumulators has been discharged below its operation area.

In order to maximize the lifetime of the accumulator arrangement, and in order to maximize the useable capacity of the accumulator arrangement it is desired to balance the charge state of the individual accumulators. This may be done at the end of a charging process, at the end of a discharging process, or during operation of the accumulator arrangement, i.e. when the accumulator arrangement is used for providing a supply voltage to a load.

In this connection the circuit arrangement of. FIG. 1 comprises a number of first series circuits each having a switching element 21, 22, 23, 2n, and an inductive storage element 11, 12, 13, 1n, with the number of first series circuits corresponding to the number of accumulators 91-9n. During operation of the circuit arrangement each of these first series circuits is connected in parallel to one of the accumulators 91-9n of the accumulator arrangement 9. The switching elements 21-2n of the first series circuits each comprise a load path and a control terminal, where the load paths are connected in series to the corresponding inductive storage elements 11-1n, and where control signals S1, S2, S3, Sn are fed to each of the control terminals. The control signals S1-Sn are provided by a control circuit 3, which will be explained below.

The circuit arrangement further comprises a further series circuit with a further inductive storage element 51 and a further switching element 52. This series circuit is connected between the terminals 9+, 9− of the accumulator arrangement, and is therefore connected in parallel to the series circuit of the individual accumulators 91-9n. The further switching element 52 comprises a load path, which is connected in series to the further inductive storage element 51, and a control terminal for receiving a control signal S52. During operation of the circuit arrangement this control signal S52 is also provided by the control circuit 3.

The inductive storage elements 11-1n of the first series circuits are inductively coupled to the further inductive storage element 51 of the further series circuit. This coupling may be achieved by using a transformer core (which in FIG. 1 is schematically shown as a line between the inductive storage elements) with or without an air gap, or by using an air gap, only.

The first series circuits connected in parallel to the accumulators 91-9n and the further series circuit connected in parallel to the accumulator arrangement 9 form several fly back converters, which may be operated bidirectional and which are connected between the series circuit of the accumulators 91-9n and the individual accumulators. "Bidirectional operable" in this connection means that energy from the inductive storage elements 11-1n of the first series circuits may be transferred to the further inductive storage element 51, or may be transferred from the further inductive storage element 51 to the inductive storage elements 11-1n of the first series circuits. Through this energy may selectively been taken from individual accumulators 91-9n and fed back to the overall accumulator arrangement 9, or energy may be taken from the accumulator arrangement 9 and may selectively be fed back to individual accumulators 91-9n of the accumulator arrangement 9. These two modes of operation will be explained using FIGS. 3 and 4, in which timing diagrams of control signals of the switching elements are shown.

Figure 3:
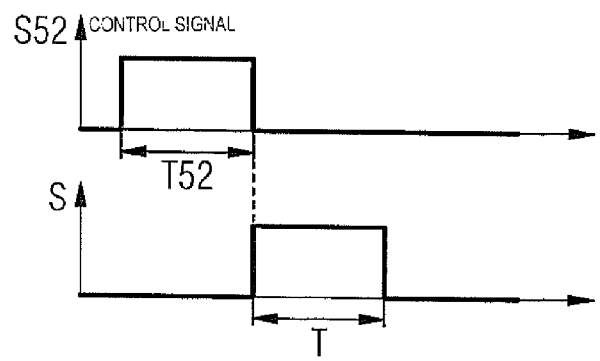
FIG. 3 by means of timing diagrams of control signals of at least one of the first switching elements and the further switching element illustrates a first operation mode of the circuit arrangement.

Referring to FIG. 3 in a first operation mode the further switching element 52 is switched on for a given on-period T52. Through this energy is taken from the accumulators 91-9n of the accumulator arrangement 9 and is stored in the further inductive storage element 51. The period for which the further switch 52 is switched on defines the energy that is taken from the accumulator arrangement 9. When the further switch 52 is opened at the end of the on-period at least one of the switches 2x of the first series circuits is closed for an on-period T. S in FIG. 3 denotes the control terminal of one or more arbitrary switches of the first series circuits. When the further switch 52 is opened and at least one of the first switches 2x is closed, the energy that has before been stored in the further inductive storage 51 element is transferred to the inductive storage element 1x that is connected in series to the at least one closed switch 2x, from where the energy flows into the accumulator connected to this inductive storage element 1x.

The inductive storage elements may be realized as coils. The winding sense of these coils is selected such, that energy from the further inductive storage element 51 to the inductive storage element of the first series circuits is transferred not until the further switch 52 has been opened. In the operation mode explained before the further inductive storage element 51 acts as a primary coil of the fly back converters formed by the inductive storage elements.

After the further switch 52 has been opened in the operation mode according to FIG. 3 at least one of the switches of the first series circuits should be closed in order to avoid overvoltages at the inductive storage elements 11-1n of the first series circuits. Optional rectifying elements, e.g. diodes, may be connected in parallel to the switching elements S1-Sn. In FIG. 1 one of these rectifying elements is depicted in dashed lines for switching element S3. These rectifying elements are connected such that they allow current to flow from the inductive storage 11-1n elements to the accumulators 91-9n connected thereto, but prevent a current to flow in the opposite direction, thereby preventing unintended discharge of the accumulators 91-9n.

If, after the further switch 52 has been opened, none of the switches of the first series circuits is closed, the rectifying elements allow a current to flow to the accumulators, and thereby prevent overvoltages at the inductive storage elements 11-1n of the first series circuits. The on-resistances of such rectifying elements are higher than the on-resistance of a closed switching element. After one of the first switching elements has been closed a bigger part of the energy still stored in the further inductive storage element 51 is then transferred to that accumulator which is connected to the closed switching element.

Figure 4:
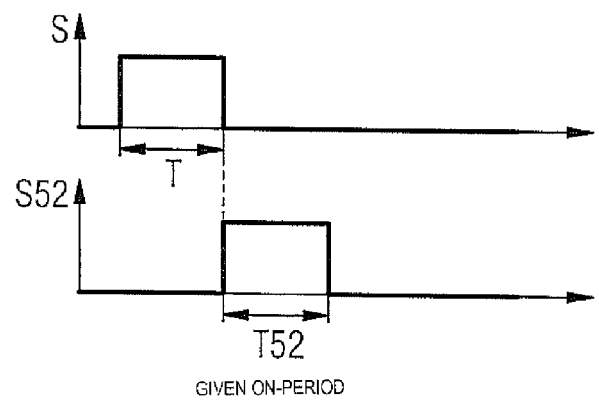
FIG. 4 by means of timing diagrams of control signals of at least one of the first switching elements and the further switching element illustrates a second operation mode of the circuit arrangement.

Referring to FIG. 4 in a second operation mode of the circuit arrangement one of the switching elements of the first series circuits is closed for a given on-period T, so that energy is taken from the accumulator connected to the closed switching element and is stored in the inductive storage element connected to the closed switching element. If this switch element is opened the further switch 52 connected in series to the further inductive storage element 51 is closed, and the energy stored before is transferred to the further inductive storage element 51, from where it flows into the overall accumulator arrangement 9 via the connection terminal is 9+, 9−. In order to avoid overvoltages across the further inductive storage element 51 a rectifying element, e.g. a diode for example, may be connected in parallel to the further switching element 52. This rectifying element is connected such, that it allows no current to flow via the connecting terminals 9+, 9− of the accumulator arrangement 9 when the further switch 52 is open.

The first operation mode, for example, is activated, if one or more accumulators of the accumulator arrangement 9 have been discharged to a higher degree than other accumulators during a discharging process. In this case energy is taken from the accumulator arrangement 9, which is than selectively distributed to the accumulators that have been discharged more, in order to balance the charge state of the individual accumulators. The second operation mode, for example, is activated if after a charging process one of the accumulators is charged more than the other accumulators of the accumulator arrangement. In this case energy is selectively taken from the accumulator that has been charged more, with the energy then being distributed to the overall accumulator arrangement.

Selection of the operation mode and selection of the accumulators that selectively receive energy or from which energy is taken, is performed by the control circuit 3 dependent on accumulator voltages V1, V2, V3, Vn across the accumulators 91-9n. In this connection measurement signals M1, M2, M3, Mn are fed to the control circuit 3, with each of these measurement signals M1-Mn representing one of the accumulator voltages V1-Vn. The individual measurement signals may be provided by differential amplifiers (e.g. 4) that are connected in parallel to the individual accumulators 91-9n. An example is shown for accumulator 91 in FIG. 1. In this connection reference numeral 4 designates the differential amplifier connected in parallel to this accumulator 91. It should be understood that these measurement signals M1-Mn may be generated in any way from the accumulator voltages V1-Vn either.

Referring to FIG. 2, the voltage across an accumulator can be a measure for the charge state of the accumulator. The measurement signals M1-Mn provided to the control terminal 3 therefore represent the charge state of the individual accumulators 91-9n. The control circuit 3 is adapted to select the operation mode for the transfer of charge between the individual accumulators dependent on these measurement signals M1-Mn.

"Balancing cycle" in the following denotes one of the processes explained by means of FIGS. 3 and 4, in which energy from the overall arrangement is selectively transferred to individual accumulators, or in which energy is selectively taken from individual accumulators and transferred to the overall arrangement. With regard to the number of balancing cycles, the operation mode, and the selection of individual accumulators, which are selectively provided with energy of from which energy is taken, different strategies may be performed, some of which will be explained in the following as examples.

The number of balancing cycles to be performed may be fixed. Further, balancing cycles may be performed until the charge states of the individual accumulators differ from each other less than a given measure. In this connection balancing cycles may be repeated until a voltage difference between the accumulator currently having the highest charge state and the accumulator currently having the lowest charge state is lower than a given threshold. This strategy my be applied for balancing cycles of the first operation mode as well as for balancing cycles of the second operation mode.

The first operation mode, for example, is selected, if the charge state of one or more accumulators is lower than the charge state of the majority of the remaining accumulators. The second operation mode, for example, is selected, if the charge state of one ore more accumulators is higher than the charge state of the majority of the remaining accumulators. Furthermore, the operation mode may be predefined by an external signal (not shown) provided to the control circuit 3. This signal, for example, may be generated by the charging circuit to, for example, select the first operation mode at the end of the charging process and to thereby selectively take energy from individual accumulators, or to select the second operation mode at the end of a discharging process and to therefore selectively feed energy to individual accumulators. Such external signal may also be generated dependent on the direction of a current that has flown into the accumulator arrangement or from the accumulator arrangement before. If a current has flown into the accumulator arrangement a charging process is assumed and the second operation mode is selected, for example. If a current has flown from the accumulator arrangement, a discharging process is assumed, and the first operation mode is selected, for example.

Figure 5:
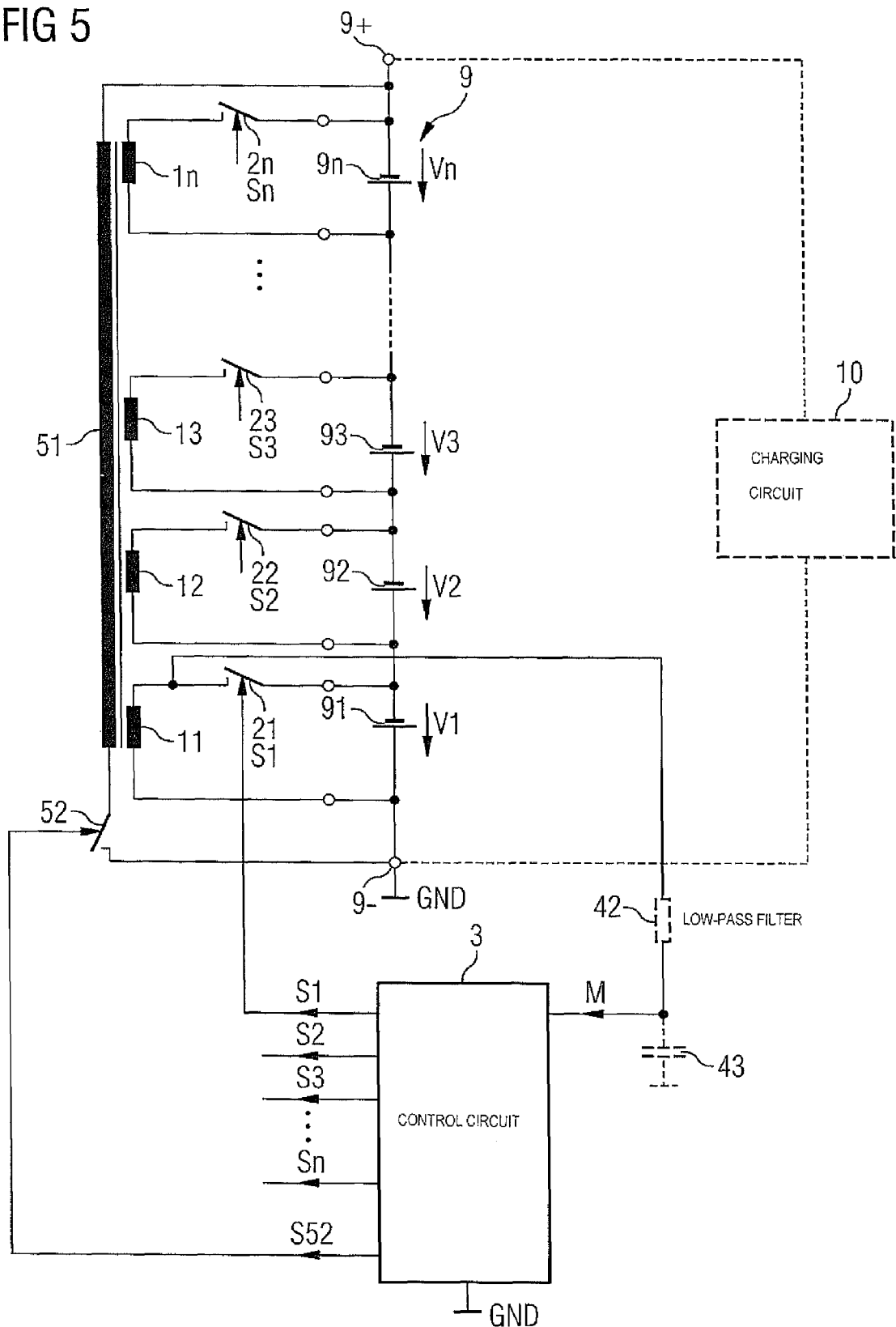
FIG. 5 shows a second example of a circuit arrangement for transferring electrical charge between accumulators.

FIG. 5 shows an example of a circuit arrangement in which the control circuit 3 comprises only one measurement input for feeding a measurement signal M. In this circuit arrangement the measurement input of the control circuit 3 is connected to the inductive storage element 11 of the first series circuit that is connected in parallel to the lowest accumulator 51. In this regard the "lowest accumulator" is the accumulator which is connected to the second or negative connection terminal 9− of the accumulator arrangement. For explanation purposes it is assumed that the negative connection terminal 9− is connected to a reference potential GND, e.g. ground, and that the control circuit 3 is connected to the same reference potential GND, so that signals (not shown) occurring in the control circuit 3 are related to this reference potential. A voltage fed to the control circuit 3 via the measurement input and which is related to reference potential GND than corresponds to the voltage across the inductive storage element 11. The negative connection terminal 9− and the control circuit 3 may also be connected to different reference potentials. In this case an offset, i.e. a potential difference between these two reference potentials, has to be taken into account when processing the measurement signal fed to the control circuit 3.

Inductive coupling the first inductive storage elements 11-1n to the further inductive storage element 53 also involves a mutual inductive coupling of the first inductive storage element. If one of the first switches S1-Sn of the first series circuits is closed, a voltage is present across the inductive storage element connected to the closed switch, that corresponds to the voltage V1-Vn across the accumulator assigned to this series circuit. Due to the inductive coupling and due to the same winding sense of the first inductive storage elements the voltage across the inductive storage element connected to the closed switch is transferred to the other inductive storage elements, and is therefore also transferred to the inductive storage element 11 of the lowest accumulator 91. The control circuit 3 of FIG. 5 for measuring the voltage across one of the accumulators is adapted to close the switch connected to this accumulator for a given time period, between 4 µs and 12 µs, for example, and to measure the voltage across the inductive storage element 11 of the lowest accumulator 91. An optional low-pass filter 42, 43 is connected between this inductive storage element 11 and the measurement input of the control circuit 3. The low-pass filter serves to filter voltage swings, that occur during switching, for example in parasitic elements, like stray inductivities.

For measuring the accumulator voltages of all accumulators the control circuit 3 is adapted to close the first switches S1-Sn subsequently and to determine the voltage across the inductive storage element 11. The measured voltages are stored within the control circuit 3, e.g. in a register, and the stored measurement values are than evaluated in order to select one of the possible operation modes and in order to select the accumulator or the accumulators, which are selectively provided with energy or which energy is selectively taken from.

Figure 6:
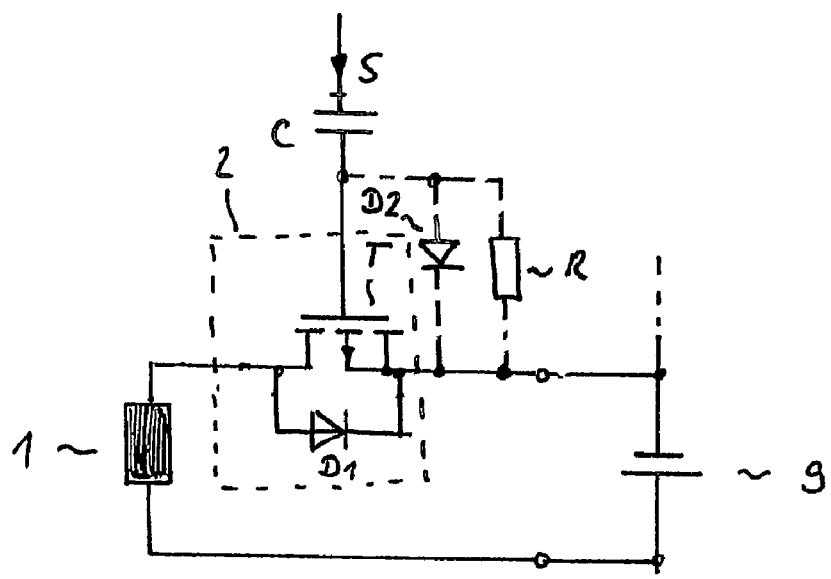
FIG. 6 illustrates a first example of the switching element of the first series circuits.
Figure 7:
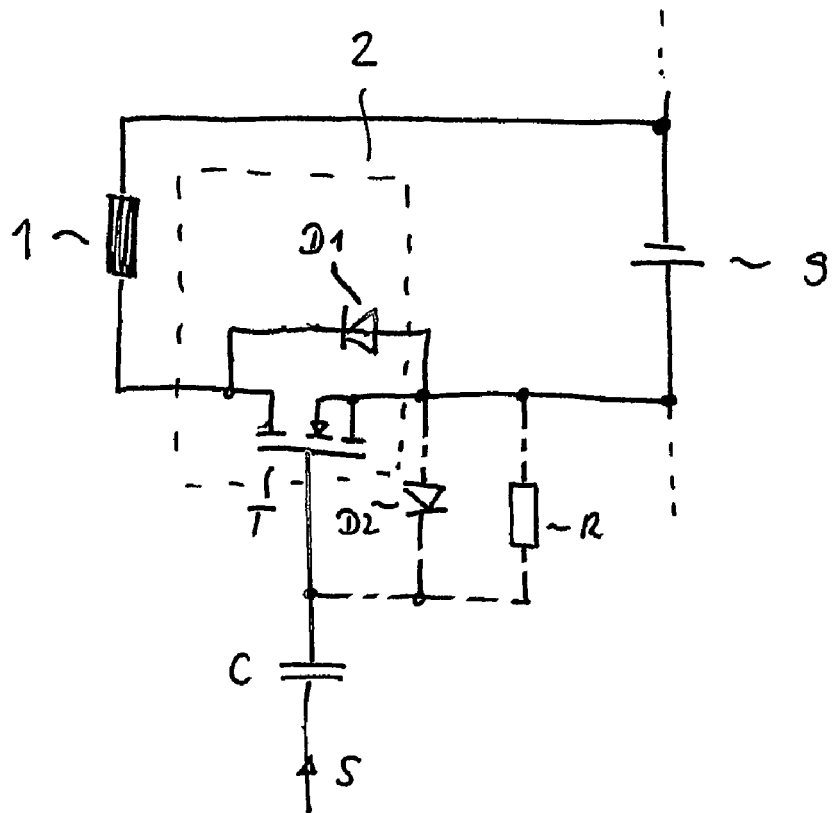
FIG. 7 illustrates a second example of a switching element of the first series circuits.

The switching elements 21-2n of the first series circuits may be realized as MOS transistors, e.g. IGBTs or MOSFETs, which will be explained by means of FIGS. 6 and 7. In these figures reference numeral 2 in general denotes any of the first switching elements, reference numeral 9 denotes any of the accumulators, and reference numeral 1 denotes any of the first inductive storage elements. FIG. 6 illustrates using a p-MOSFET as switching element, while FIG. 7 illustrates using a n-MOSFET. As is generally known MOSFETs comprise a drain-source-path, that forms a load path, and a gate terminal, that forms a control terminal. The conducting behaviour of the load path of the MOSFET is determined by a control potential at the gate terminal. Parallel to the load path common MOSFETs comprise a freewheeling diode D1, which is explicitly shown for the MOSFET T in FIGS. 6 and 7. For a p-MOSFET (FIG. 6) this freewheeling diode D1 is connected in a blocking direction (reverse direction) between the source terminal and the drain terminal, and for a n-MOSFET (FIG. 7) the freewheeling diode is connected in a forward direction between the source terminal and the drain terminal. To avoid discharging of the accumulator 9 in case of a blocking MOSFET T, referring to FIG. 6 a p-MOSFET is to be connected between a positive terminal of the accumulator and the inductive storage element 1, and, referring to FIG. 7, a n-MOSFET is to be connected between the minus terminal of the accumulator and the inductive storage element 11, where the source terminal of the MOSFET is connected to the accumulator. The source terminal therefore is always on a DC potential, which facilitates its control.

For galvanic isolation (potential isolation) between the control circuit 3 and the gate terminal of the MOSFET T a capacitance is connected between the control terminal 9 and the gate terminal of MOSFET T. The self-blocking p-MOSFET of FIG. 6 conducts, if an electrical potential at its gate terminal is more than its threshold voltage below the electrical potential at the source terminal. Under the assumption that the gate terminal and the source terminal prior to switching on almost have the same electrical potential, this p-MOSFET may be switched on using a negative control pulse of the control signal. The n-MOSFET of FIG. 7 conducts for a gate potential which more than its threshold voltage is above the source potential. Correspondingly the n-MOSFET may be switched on using a positive pulse of the control signal S. The control circuit 3 is adapted to provide negative or positive control pulses at its control outputs depending whether a p-MOSFET or a n-MOSFET is connected to the corresponding output terminal. The control circuit is configured dependent on the transistors used. In this connection it is to be understood that the individual switching elements within the switching circuit may be different, i.e. some of the first switching elements may be n-MOSFET, while others may be p-MOSFET. In the circuit arrangement of FIG. 5 in which the voltage across the inductive storage element 11 of the lowest accumulator 9 is picked off for measurement purposes the first switch 21 is to be connected between the plus terminal and the inductive storage element 11. This switch, for example, may be a p-MOSFET, while the other switches of the switching circuit may be n-MOSFET, which—in opposite to the diagram in FIG. 5—are than connected between the minus terminals of the accumulators and the corresponding inductive storage elements.

Referring to FIGS. 6 and 7 an optional resistor R is connected between the gate terminal and the source terminal of the MOSFET. This resistor limits the maximum on-period of the MOSFET T by slowly discharging the gate electrode to source potential depending on its resistance value. This resistance value is selected such that the maximum possible on-period is longer than usual on-periods determined by the control circuit 3 during operation of the circuit arrangement. The MOSFET is thereby prevented from permanently being switched on in case of an error occurring in the control circuit.

Furthermore, an optional further rectifying element D2, e.g. a diode, is connected between the gate terminal and the source terminal of MOSFET T. This rectifying elements limits the gate potential of the MOSFET T as compared to the source potential to a value which is given by the characteristic of the rectifying element. For the diode in FIGS. 6 and 7 this value is the forward voltage of the diode. For a switching-on-pulse almost the complete voltage sweep of the control signal provided by the control circuit 3 is hereby transferred to the gate.

Although various examples to realize the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Such modifications to the inventive concept are intended to be covered by the appended claims.

The invention claimed is:

1. A circuit arrangement for transferring electrical charge between accumulators of an accumulator arrangement comprising a series circuit of accumulators, comprising a number of first series circuits each for connecting in parallel to one of the accumulators, and each comprising a switching element having a load path and a control terminal, and an inductive storage element connected in series to the load path;

a further series circuit for connecting in parallel to the accumulator arrangement and comprising a further switching element having a load path and a control terminal, and a further inductive storage element connected in series to the load path, the further inductive storage element being inductively coupled to the inductive storage elements of the first series circuits;

a control circuit comprising a number of first control outputs each of which being connected to the control terminal of one of the switching elements of the first series circuits, and a further control output connected to the control terminal of the further switching element;

wherein the circuit arrangement is configured to assume an operation mode in which the control circuit closes a switching element of a first series circuit of one of the accumulators via the corresponding control input to selectively take energy from the accumulator, and in which the control circuit opens the switching element of the first series circuit of the accumulator and closes the further switching element via the corresponding control input and the further control input, respectively, to subsequently feed the energy back to the accumulator arrangement.

2. The circuit arrangement according to claim 1, in which the first control outputs of the control circuit are connected to the control terminals of the switching elements of the first series circuits using capacitances.

3. The circuit arrangement according to claim 1, in which the control circuit comprises a voltage measurement input coupled to the inductive storage element of one of the first series circuits.

4. The circuit arrangement according to claim 3, in which the inductive storage elements of the first series circuits are inductively coupled to one another.

5. The circuit arrangement according to claim 4, wherein the control circuit is configured to measure the voltage across the inductive storage element of another one of the first series circuits when switching element of the one of the first series circuits is open and the switching element of the other one of the first series circuits is closed.

6. The circuit arrangement according to one of claim 4 or 5, in which a low-pass filter is connected between the inductive storage element coupled to the measurement input and the measurement input.

7. The circuit arrangement according to claim 1, in which at least one of the switching elements of the first series circuits is a MOS transistor.

8. The circuit arrangement according to claim 7, in which the MOS transistor is a MOSFET.

9. The circuit arrangement according to claim 1, in which the control circuit is adapted for measuring the voltage across at least two of the accumulators, dependent on the measured voltages closing the further switching element for a first given time period, and subsequently closing at least one switching element of these first series circuits, which are connected in parallel to the at least two accumulators, for a second given time period.

10. The circuit arrangement according to claim 9, in which the control circuit is adapted for closing the switch of that series circuit which is connected to the one of the at least two accumulators for which a lowest voltage has been measured.

11. The circuit arrangement according to claim 10, in which the control circuit is adapted for measuring the voltage across at least two of the accumulators, closing at least one switching element of these first series circuits, which are connected in parallel to the at least two accumulators, for a third given time period, and subsequently closing the further switching element for a fourth given time period.

12. The circuit arrangement according to claim 11, in which the control circuit is adapted for closing the switch of that series circuit which is connected to the one of the at least two accumulators for which a highest voltage has been measured.

13. A method of transferring electrical charge between accumulators of an accumulator arrangement comprising a series circuit of accumulators, comprising
- measuring accumulator voltages across at least two of the accumulators of the accumulator arrangement by respectively closing a switch connected to each of the at least two of the accumulators and measuring a voltage across an inductive storage element connected to another one of the accumulators,
- selecting at least one of the some accumulators dependent on the measured accumulator voltages,
- taking energy from the accumulator arrangement,
- feeding at least a part of the energy taken from the accumulator arrangement to the at least one selected accumulator, only.

14. A circuit arrangement for transferring electrical charge between accumulators of an accumulator arrangement comprising a series circuit of accumulators, comprising a number of first series circuits each for connecting in parallel to one of the accumulators, and each comprising a switching element having a load path and a control terminal, and an inductive storage element connected in series to the load path;
- a further series circuit for connecting in parallel to the accumulator arrangement and comprising a further switching element having a load path and a control terminal, and a further inductive storage element connected in series to the load path, the further inductive storage element being inductively coupled to the inductive storage elements of the first series circuits;
- a control circuit comprising a number of first control outputs each of which being connected to the control terminal of one of the switching elements of the first series circuits, and a further control output connected to the control terminal of the further switching element; wherein the control circuit further includes a voltage measurement input coupled to the inductive storage elements of one of the first series circuits,
- wherein the inductive storage elements of the first series circuits are inductively coupled to one another, and
- wherein the control circuit is configured to measure the voltage across the inductive storage element of another one of the first series circuits when i) the switching element of the one of the first series circuits is open and ii) the switching element of the other one of the first series circuits is closed.

15. A method for transferring electrical charge between accumulators in a circuit arrangement, the circuit arrangement comprising:
- a number of first series circuits each for connecting in parallel to one of the accumulators, and each comprising a switching element having a load path and a control terminal, and an inductive storage element connected in series to the load path;
- a further series circuit for connecting in parallel to the accumulator arrangement and comprising a further switching element having a load path and a control terminal, and a further inductive storage element connected in series to the load path, the further inductive storage element being inductively coupled to the inductive storage elements of the first series circuits;
- a control circuit comprising a number of first control outputs each of which being connected to the control terminal of one of the switching elements of the first series circuits, and a further control output connected to the control terminal of the further switching element, the method including:
- closing the switching element of the first series circuit of one of the accumulators,
- measuring a voltage across the one of the accumulators,
- opening the inductive storage element of another series circuit, and
- measuring the voltage across the inductive storage element.

\* \* \* \* \*